United States Patent
Choi et al.

(10) Patent No.: US 11,492,487 B2
(45) Date of Patent: Nov. 8, 2022

(54) THERMOPLASTIC RESIN COMPOSITION AND ARTICLE PRODUCED THEREFROM

(71) Applicant: Lotte Advanced Materials Co., Ltd., Yeosu-si (KR)

(72) Inventors: Ki Hong Choi, Uiwang-si (KR); Tae Gon Kang, Uiwang-si (KR); Sun Young Kim, Uiwang-si (KR); Sung Woo Yang, Uiwang-si (KR); Sang Hoon Lee, Uiwang-si (KR); Seo Hee Chang, Uiwang-si (KR); Dong In Ha, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 197 days.

(21) Appl. No.: 16/667,094

(22) Filed: Oct. 29, 2019

(65) Prior Publication Data

US 2020/0131361 A1    Apr. 30, 2020

(30) Foreign Application Priority Data

Oct. 31, 2018 (KR) .................. 10-2018-0131683
Aug. 20, 2019 (KR) .................. 10-2019-0101662

(51) Int. Cl.
*C08L 69/00* (2006.01)
*C08J 5/04* (2006.01)
*H04R 31/00* (2006.01)

(52) U.S. Cl.
CPC .............. *C08L 69/00* (2013.01); *C08J 5/043* (2013.01); *H04R 31/003* (2013.01); *C08J 2369/00* (2013.01); *C08J 2409/06* (2013.01); *C08J 2413/00* (2013.01); *C08L 2201/02* (2013.01); *C08L 2205/03* (2013.01); *C08L 2205/035* (2013.01); *H04R 2307/025* (2013.01)

(58) Field of Classification Search
CPC .. C08L 69/00; C08L 2201/02; C08L 2205/03; C08L 2205/035; C08J 5/043; C08J 2369/00; C08J 2409/06; C08J 2413/00; H04R 31/003; H04R 2307/025; C08K 5/043

See application file for complete search history.

(56) References Cited

U.S. PATENT DOCUMENTS

| 5,061,745 | A | 10/1991 | Wittmann et al. | |
| 5,441,997 | A * | 8/1995 | Walsh | C08K 3/30 524/147 |
| 2006/0014863 | A1 | 1/2006 | Lim et al. | |
| 2010/0029855 | A1 | 2/2010 | Matsuoka et al. | |
| 2015/0005422 | A1* | 1/2015 | Ha | C08L 69/00 524/127 |
| 2016/0160044 | A1* | 6/2016 | Kanaya | C08J 5/043 523/351 |

FOREIGN PATENT DOCUMENTS

| CN | 1649960 A | 8/2005 | |
| CN | 104693718 A | 6/2015 | |
| CN | 107915979 A1 | 4/2018 | |
| EP | 2100918 A1 | 9/2009 | |
| JP | 2012-246370 A | 12/2012 | |
| WO | WO-2017216678 A1 * | 12/2017 | ............... C09K 5/14 |

OTHER PUBLICATIONS

Kulich et al. Acrylonitrile-Butadiene-Styrene (ABS) Polymers. Kirk-Othmer Encyclopedia of Chemical Technology. pp. 414-438. Jun. 20, 2003. (Year: 2003).*
Wang et al. The Influence of Barium Sulfate on the Mechanical Properties of Glass/Epoxy Resin Composite. Polymers & Polymer Composites, vol. 16, No. 4, 2008. pp. 257-262 (Year: 2008).*
Office Action in counterpart Chinese Application No. 201911050902.5 dated Sep. 29, 2021, pp. 1-5.

* cited by examiner

*Primary Examiner* — John E Uselding
(74) *Attorney, Agent, or Firm* — Additon, Pendleton & Witherspoon, P.A.

(57) ABSTRACT

A thermoplastic resin composition and a molded article formed of the same. The thermoplastic resin composition includes: about 100 parts by weight of a polycarbonate resin; about 5 to about 20 parts by weight of a rubber modified aromatic vinyl copolymer resin; about 0.5 to about 3 parts by weight of a maleic anhydride-grafted rubber polymer; about 50 to about 100 parts by weight of glass fibers; about 10 to about 30 parts by weight of barium sulfate; and about 5 to about 20 parts by weight of a phosphorus flame retardant. The thermoplastic resin composition can have high specific gravity and good properties in terms of impact resistance, weather resistance, flame retardancy, fluidity, and the like.

11 Claims, No Drawings

THERMOPLASTIC RESIN COMPOSITION AND ARTICLE PRODUCED THEREFROM

CROSS-REFERENCE TO RELATED APPLICATION

This application claims priority under 35 USC Section 119 to and the benefit of Korean Patent Application No. 10-2018-0131683, filed on Oct. 31, 2018, and Korean Patent Application No. 10-2019-0101662, filed on Aug. 20, 2019, the entire disclosure of each of which is incorporated herein by reference.

FIELD

The present invention relates to a thermoplastic resin composition and a molded article formed of the same.

BACKGROUND

A thermoplastic resin composition including a polycarbonate resin and the like can have good properties in terms of impact resistance, flame retardancy, processability, and the like to be advantageously used for housings of electric/electronic products and interior/exterior materials for office equipment.

When such a thermoplastic resin composition is applied to a speaker, the thermoplastic resin composition may include predetermined amounts of inorganic fillers, such as talc, wollastonite, glass fibers, and the like, to increase the specific gravity of a speaker material in order to improve sound quality of the speaker.

However, when the thermoplastic resin composition includes an excess of the inorganic fillers, the thermoplastic resin composition can suffer from decomposition of a polycarbonate resin, causing deterioration in mechanical properties, weather resistance, flame retardancy, and the like, and damage to products produced using the resin composition.

Therefore, there is a need for a thermoplastic resin composition that has high specific gravity and exhibits good properties in terms of impact resistance, weather resistance, flame retardancy, and fluidity (processability) to secure good sound quality.

SUMMARY OF THE INVENTION

The present disclosure relates to a thermoplastic resin composition which can have high specific gravity characteristics and can exhibit good properties in terms of impact resistance, weather resistance, flame retardancy and/or fluidity, and a molded article formed of the same.

The thermoplastic resin composition includes: about 100 parts by weight of a polycarbonate resin; about 5 to about 20 parts by weight of a rubber modified aromatic vinyl copolymer resin; about 0.5 to about 3 parts by weight of a maleic anhydride-grafted rubber polymer; about 50 to about 100 parts by weight of glass fibers; about 10 to about 30 parts by weight of barium sulfate; and about 5 to about 20 parts by weight of a phosphorus flame retardant.

The rubber modified aromatic vinyl copolymer resin may include a rubber modified aromatic vinyl graft copolymer and an aromatic vinyl copolymer resin.

The rubber modified aromatic vinyl graft copolymer can be prepared by graft polymerization of a monomer mixture including an aromatic vinyl monomer and a vinyl cyanide monomer to the rubber polymer.

The maleic anhydride-grafted rubber polymer may include maleic anhydride-grafted ethylene-octene rubber (EOR-g-MAH), maleic anhydride-grafted ethylene-butene rubber (EBR-g-MAH), maleic anhydride-grafted ethylene-propylene-diene monomer tripolymer (EPDM-g-MAH), maleic anhydride-grafted styrene-ethylene-butylene styrene copolymer (SEBS-g-MAH), maleic anhydride-grafted polypropylene (PP-g-MAH), and/or maleic anhydride-grafted polyethylene (PE-g-MAH).

The phosphorus flame retardant may include a phosphate compound, a phosphonate compound, a phosphinate compound, a phosphine oxide compound, and/or a phosphazene compound.

The maleic anhydride-grafted rubber polymer and the barium sulfate may be present in a weight ratio of about 0.03:1 to about 0.1:1.

The glass fibers and the barium sulfate may be present in a weight ratio of about 3:1 to about 5:1.

The thermoplastic resin composition may have a notched Izod impact strength of about 10 kgf·cm/cm to about 20 kgf·cm/cm, as measured on a ⅛" thick specimen in accordance with ASTM D256.

The thermoplastic resin composition may have a yellow index difference ($\Delta YI$) of about 1 to about 5, as measured on an injection molded specimen having a size of 50 mm×90 mm×3 mm in accordance with Equation 1:

$$\Delta YI = YI_1 - YI_0 \quad \text{[Equation 1]}$$

where $YI_0$ is an initial yellow index of the specimen of the thermoplastic resin composition and $YI_1$ is a yellow index of the specimen measured after exposure under conditions of 85° C. and 85% relative humidity (RH) for 500 hours.

The thermoplastic resin composition may have a flame retardancy of V-1 or higher, as measured on a 3 mm thick specimen in accordance with UL-94.

The thermoplastic resin composition may have a melt-flow index (MI) of about 30 to about 45 g/10 min, as measured under conditions of 250° C. and 10 kgf in accordance with ASTM D1238.

The thermoplastic resin composition may have a specific gravity of about 1.55 to about 1.65, as measured at 23° C. in accordance with ASTM D792 A.

The present disclosure also relates to a molded article. The molded article is formed of the thermoplastic resin composition as set forth above.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A thermoplastic resin composition according to the present disclosure includes: (A) a polycarbonate resin; (B) a rubber modified aromatic vinyl copolymer resin; (C) a maleic anhydride-grafted rubber polymer; (D) glass fibers; (E) barium sulfate; and (F) a phosphorus flame retardant.

As used herein to represent a specific numerical range, the expression "a to b" means "≥a and ≤b".

(A) Polycarbonate Resin

The polycarbonate resin according to embodiments of the present disclosure may be a polycarbonate resin used in typical thermoplastic resin compositions. For example, the polycarbonate resin may be an aromatic polycarbonate resin obtained by reacting a precursor, such as phosgene, halogen formate, and/or carbonic diester, with diphenol(s) (aromatic diol compounds).

Examples of the diphenols may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, and/or 2,2-bis(3,5-dichloro-4-hydroxyphenyl)propane, and the like, and combinations and/or mixtures thereof, without being limited thereto. For example, the diphenol may include 2,2-bis(4-hydroxyphenyl)propane, 2,2-bis(3,5-dichloro-4-hydroxyphenyl)propane, and/or 1,1-bi s(4-hydroxyphenyl)cyclohexane, for example 2,2-bis-(4-hydroxyphenyl)propane, which is also referred to as bisphenol A.

The polycarbonate resin may be a branched polycarbonate resin. For example, the polycarbonate resin may be a branched polycarbonate resin obtained by adding about 0.05 mol % to about 2 mol % of a tri- or higher polyfunctional compound, for example, a tri- or higher valent phenol group-containing compound, based on the total number of moles of the diphenols used in polymerization.

The polycarbonate resin may be a homopolycarbonate resin, a copolycarbonate resin, or a blend thereof. The polycarbonate resin may be partially or completely replaced by an aromatic polyester-carbonate resin obtained by polymerization in the presence of an ester precursor, for example, a bifunctional carboxylic acid.

The polycarbonate resin may have a weight average molecular weight (Mw) of about 10,000 g/mol to about 50,000 g/mol, for example, about 15,000 g/mol to about 40,000 g/mol, as measured by gel permeation chromatography (GPC). Within this range, the thermoplastic resin composition can have good fluidity (processability), and the like.

The polycarbonate resin may have a melt-flow index (MI) of about 5 g/10 min to about 110 g/10 min, as measured under conditions of 300° C. and a load of 1.2 kgf in accordance with ISO 1133. In addition, the polycarbonate resin may be a mixture of two or more polycarbonate resins having different melt-flow indices.

(B) Rubber-Modified Aromatic Vinyl Copolymer Resin

The rubber modified aromatic vinyl copolymer resin according to embodiments of the present disclosure may include (B1) a rubber modified aromatic vinyl graft copolymer and (B2) an aromatic vinyl copolymer resin.

(B1) Rubber Modified Aromatic Vinyl Graft Copolymer

The rubber modified aromatic vinyl graft copolymer according to embodiments of the present disclosure may be obtained by graft polymerization of a monomer mixture comprising an aromatic vinyl monomer and optionally a vinyl cyanide monomer to a rubber polymer. For example, the rubber modified aromatic vinyl graft copolymer may be obtained by graft polymerization of the monomer mixture comprising the aromatic vinyl monomer and optionally the vinyl cyanide monomer to the rubber polymer, in which the monomer mixture may further optionally include a monomer for imparting processability and/or heat resistance, as needed.

As used herein, polymerization may be performed by any typical polymerization method, such as emulsion polymerization, suspension polymerization, and the like.

In addition, the rubber modified aromatic vinyl graft copolymer may form a core (rubber polymer)-shell (copolymer of the monomer mixture) structure, without being limited thereto.

Examples of the rubber polymer may include without limitation diene rubbers, such as polybutadiene, poly(styrene-butadiene), and/or poly(acrylonitrile-butadiene); saturated rubbers obtained by adding hydrogen to the diene rubbers; isoprene rubbers; $C_2$ to $C_{10}$ alkyl (meth)acrylate rubbers; copolymers of a $C_2$ to $C_{10}$ alkyl (meth)acrylate and styrene; and/or ethylene-propylene-diene monomer terpolymer (EPDM); and the like. These may be used alone or as a mixture thereof. For example, the rubber polymer may include diene rubbers and/or (meth)acrylate rubbers. For example, the rubber polymer may include butadiene rubber and/or butyl acrylate rubber.

The rubber polymer (rubber particle) may have an average particle diameter (Z-average) of about 0.05 μm to about 6 μm, for example, about 0.15 μm to about 4 μm, and as another example about 0.25 μm to about 3.5 μm. Within this range, the thermoplastic resin composition can have good properties in terms of impact resistance, external appearance, and the like.

As used herein, the average particle diameter (z-average) of the rubber polymer (rubber particles) may be measured by a light scattering method in a latex state using methods and equipment known in the art. Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co. Ltd., nano-zs).

The rubber polymer may be present in an amount of about 20 wt % to about 70 wt %, for example, about 25 wt % to about 60 wt %, and the monomer mixture (including the aromatic vinyl monomer and the vinyl cyanide monomer) may be present in an amount of about 30 wt % to about 80 wt %, for example, about 40 wt % to about 75 wt %, each based on 100 wt % of the rubber modified aromatic vinyl graft copolymer.

In some embodiments, the rubber modified aromatic vinyl graft copolymer can include the rubber polymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt % based on 100 wt % of the rubber modified aromatic vinyl graft copolymer. Further, according to some embodiments, the rubber polymer can be present in an amount of from about any of the foregoing amounts to about any other of the foregoing amounts.

In some embodiments, the rubber modified aromatic vinyl graft copolymer can include the monomer mixture in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt % based on 100 wt % of the rubber modified aromatic vinyl graft copolymer. Further, according to some embodiments, the monomer mixture can be present in an amount of from about any of the foregoing amounts to about any other of the foregoing amounts.

Within these ranges, the thermoplastic resin composition can have good properties in terms of impact resistance, external appearance, and the like.

The aromatic vinyl monomer may be graft copolymerizable with the rubber polymer. Examples of the aromatic vinyl monomer may include without limitation styrene, α-methylstyrene, β-methylstyrene, p-methylstyrene, p-t-butylstyrene, ethylstyrene, vinylxylene, monochlorostyrene, dichlorostyrene, dibromostyrene, and/or vinyl naphthalene, and the like, without being limited thereto. These may be used alone or as a mixture thereof.

The monomer mixture can include the aromatic vinyl monomer in an amount of about 10 wt % to about 90 wt %, for example, about 10 wt % to about 60 wt %, based on 100 wt % of the monomer mixture. In some embodiments, the monomer mixture can include the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on 100 wt % of the monomer mixture. Further, according to some embodiments, the aromatic vinyl monomer can be present in an amount of from about any of the foregoing amounts to about any other of the foregoing amounts.

Within this range, the thermoplastic resin composition can have good properties in terms of processability, impact resistance, and the like.

The vinyl cyanide monomer is copolymerizable with the aromatic vinyl monomer. Examples of the vinyl cyanide monomer may include without limitation acrylonitrile, methacrylonitrile, ethacrylonitrile, phenyl acrylonitrile, α-chloroacrylonitrile, and/or fumaronitrile, and the like. These may be used alone or as a mixture thereof. For example, the vinyl cyanide monomer may be acrylonitrile and/or methacrylonitrile.

The monomer mixture can include the vinyl cyanide monomer in an amount of about 90 wt % or less, for example about 10 wt % to about 90 wt %, and as another example, about 10 wt % to about 60 wt %, based on 100 wt % of the monomer mixture. In some embodiments, the monomer mixture can include the vinyl cyanide monomer in an amount of 0 (the vinyl cyanide monomer is not present), about 0 (the vinyl cyanide monomer is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on 100 wt % of the monomer mixture. Further, according to some embodiments, the vinyl cyanide monomer can be present in an amount of from about any of the foregoing amounts to about any other of the foregoing amounts.

Within this range, the thermoplastic resin composition can have good properties in terms of chemical resistance, mechanical properties, and the like.

Examples of the monomer for imparting processability and/or heat resistance may include (meth)acrylic acid, a $C_1$ to $C_{10}$ alkyl (meth)acrylate, maleic anhydride, and/or N-substituted maleimide, and the like, and mixtures and/or combinations thereof, without being limited thereto. The monomer for imparting processability and/or heat resistance may be present in an amount of about 90 wt % or less, for example, about 30 wt % to about 80 wt %, based on 100 wt % of the monomer mixture. In some embodiments, the monomer mixture can include the monomer for imparting processability and/or heat resistance in an amount of 0 (the monomer for imparting processability and/or heat resistance is not present), about 0 (the monomer for imparting processability and/or heat resistance is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on 100 wt % of the monomer mixture. Further, according to some embodiments, the monomer for imparting processability and/or heat resistance can be present in an amount of from about any of the foregoing amounts to about any other of the foregoing amounts.

Within this range, the monomer for imparting processability and/or heat resistance can impart processability and/or heat resistance to the thermoplastic resin composition with minimal or no deterioration in other properties.

Examples of the rubber modified aromatic vinyl graft copolymer may include without limitation a g-ABS copolymer obtained by grafting a styrene monomer (as the aromatic vinyl compound) and an acrylonitrile monomer (as the vinyl cyanide compound) to a butadiene-based rubber polymer, a g-MBS copolymer obtained by grafting a styrene monomer (as the aromatic vinyl compound) and methyl methacrylate (as the monomer for imparting processability and/or heat resistance) to a butadiene-based rubber polymer, a g-MABS copolymer obtained by grafting a styrene monomer, an acrylonitrile monomer, and methyl methacrylate to a butyl acrylate-based rubber polymer, and/or an acrylate-styrene-acrylate (g-ASA) copolymer obtained by grafting a styrene monomer (as the aromatic vinyl compound) and an acrylonitrile monomer (as the vinyl cyanide compound) to a butyl acrylate-based rubber polymer, and the like, and mixtures and/or combinations thereof.

The rubber modified aromatic vinyl graft copolymer may be present in an amount of about 20 wt % to about 50 wt %, for example, about 25 wt % to about 45 wt %, based on 100 wt % of the rubber modified aromatic vinyl copolymer resin. In some embodiments, the rubber modified aromatic vinyl copolymer resin can include the rubber modified aromatic vinyl graft copolymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt % based on 100 wt % of the rubber modified aromatic vinyl copolymer resin. Further, according to some embodiments, the rubber modified aromatic vinyl graft copolymer can be present in an amount of from about any of the foregoing amounts to about any other of the foregoing amounts.

Within this range, the thermoplastic resin composition can exhibit good properties in terms of impact resistance, fluidity (molding processability), external appearance, and balance therebetween.

(B2) Aromatic Vinyl Copolymer Resin

The aromatic vinyl copolymer resin according to embodiments of the present disclosure may be an aromatic vinyl copolymer resin used for a typical rubber modified aromatic vinyl graft copolymer resin and does not include a rubber polymer. For example, the aromatic vinyl copolymer resin may be a polymer of a monomer mixture comprising an aromatic vinyl monomer and a monomer copolymerizable with the aromatic vinyl monomer.

The aromatic vinyl copolymer resin may be obtained by mixing the aromatic vinyl monomer and the monomer copolymerizable with the aromatic vinyl monomer, followed by polymerization. As used herein, polymerization may be carried out by any well-known polymerization method, such as emulsion polymerization, suspension polymerization, bulk polymerization, and the like.

Examples of the aromatic vinyl monomer may include without limitation styrene, α-methylstyrene, β-methyl styrene, p-methyl styrene, p-t-butylstyrene, ethyl styrene, vinylxylene, monochlorostyrene, dichlorostyrene, dibromostyrene, and/or vinyl naphthalene, and the like. These may be used alone or as a mixture thereof.

The aromatic vinyl copolymer resin can include the aromatic vinyl monomer in an amount of about 10 wt % to about 90 wt %, for example, about 20 wt % to about 80 wt %, based on 100 wt % of the aromatic vinyl copolymer resin. In some embodiments, the aromatic vinyl copolymer resin can include the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on 100 wt % of the aromatic vinyl copolymer resin. Further, according to some embodiments, the aromatic vinyl monomer can be present in an amount of from about any of the foregoing amounts to about any other of the foregoing amounts.

Within this range, the thermoplastic resin composition can exhibit good properties in terms of impact resistance, fluidity, and the like.

Examples of the monomer copolymerizable with the aromatic vinyl monomer may include without limitation vinyl cyanide monomers and/or (meth)acrylic monomers, and the like, and mixtures and/or combinations thereof. As non-limiting examples, the monomer copolymerizable with the aromatic vinyl monomer may include a vinyl cyanide monomer or a vinyl cyanide monomer and a (meth)acrylic monomer.

Examples of the vinyl cyanide monomer may include acrylonitrile, methacrylonitrile, ethacrylonitrile, phenylacrylonitrile, α-chloroacryl onitrile, and/or fumaronitrile, without being limited thereto. These may be used alone or as a mixture thereof. For example, acrylonitrile, methacrylonitrile, and the like, and mixtures and/or combinations thereof may be used.

Examples of the (meth)acrylic monomer may include without limitation (meth)acrylic acids and/or $C_1$ to $C_{10}$ alkyl (meth)acrylates. These may be used alone or as a mixture thereof. For example, methyl methacrylate, methyl acrylate, and the like, and mixtures and/or combinations thereof may be used.

In some embodiments, in the monomer copolymerizable with the aromatic vinyl monomer composed of a mixture of the vinyl cyanide monomer and the (meth)acrylic monomer, the vinyl cyanide monomer may be present in an amount of about 1 wt % to about 40 wt %, for example, about 2 wt % to about 35 wt %, and the (meth)acrylic monomer may be present in an amount of about 60 wt % to about 99 wt %, for example, about 65 wt % to about 98 wt %, based on 100 wt % of the monomer copolymerizable with the aromatic vinyl monomer.

In some embodiments, the monomer copolymerizable with the aromatic vinyl monomer composed of a mixture of the vinyl cyanide monomer and the (meth)acrylic monomer can include the vinyl cyanide monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt % based on 100 wt % of the monomer copolymerizable with the aromatic vinyl monomer composed of a mixture of the vinyl cyanide monomer and the (meth)acrylic monomer. Further, according to some embodiments, the vinyl cyanide monomer can be present in an amount of from about any of the foregoing amounts to about any other of the foregoing amounts.

In some embodiments, the monomer copolymerizable with the aromatic vinyl monomer composed of a mixture of the vinyl cyanide monomer and the (meth)acrylic monomer can include the (meth)acrylic monomer in an amount of about 60, 61, 62, 63, 64, 65, 66, 67, 68, 69, 70, 71, 72, 73, 74, 75, 76, 77, 78, 79, 80, 81, 82, 83, 84, 85, 86, 87 ,88, 89, 90, 91, 92, 93, 94, 95, 96, 97, 98, or 99 wt % based on 100 wt % of the monomer copolymerizable with the aromatic vinyl monomer composed of a mixture of the vinyl cyanide monomer and the (meth)acrylic monomer. Further, according to some embodiments, the (meth)acrylic monomer can be present in an amount of from about any of the foregoing amounts to about any other of the foregoing amounts.

Within this range, the thermoplastic resin composition can exhibit good properties in terms of transparency, heat resistance, processability, and the like.

The aromatic vinyl copolymer resin can include the monomer copolymerizable with the aromatic vinyl monomer in an amount of about 10 wt % to about 90 wt %, for example, about 20 wt % to about 80 wt %, based on 100 wt % of the aromatic vinyl copolymer resin. In some embodiments, the aromatic vinyl copolymer resin can include the monomer copolymerizable with the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on 100 wt % of the aromatic vinyl copolymer resin. Further, according to some embodiments, the monomer copolymerizable with the aromatic vinyl monomer can be present in an amount of from about any of the foregoing amounts to about any other of the foregoing amounts.

Within this range, the thermoplastic resin composition can exhibit good properties in terms of impact resistance, fluidity, and the like.

The aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin can exhibit good properties in terms of mechanical strength, formability, and the like The rubber modified aromatic vinyl copolymer resin can include the aromatic vinyl copolymer resin in an amount of about 50 wt % to about 80 wt %, for example, about 55 wt % to about 75 wt %, based on 100 wt % of the rubber modified aromatic vinyl copolymer resin. In some embodiments, the rubber modified aromatic vinyl copolymer resin can include the aromatic vinyl copolymer resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt % based on 100 wt % of the rubber modified aromatic vinyl copolymer resin. Further, according to some embodiments, the aromatic vinyl copolymer resin can be present in an amount of from about any of the foregoing amounts to about any other of the foregoing amounts.

Within this range, the thermoplastic resin composition can exhibit good properties in terms of impact resistance, fluidity (molding processability), and the like.

The thermoplastic resin composition can include the rubber modified aromatic vinyl copolymer resin (B) in an amount of about 5 to about 20 parts by weight, for example, about 7 to about 15 parts by weight, relative to about 100 parts by weight of the polycarbonate resin (A). In some embodiments, the thermoplastic resin composition can include the rubber modified aromatic vinyl copolymer resin (B) in an amount of about 5, 6, 7, 8, 9, 10, 11, 12, 13, 14, 15, 16, 17, 18, 19, or 20 parts by weight, based on about 100 parts by weight of the polycarbonate resin (A). Further, according to some embodiments, the rubber modified aromatic vinyl copolymer resin (B) can be present in an amount of from about any of the foregoing amounts to about any other of the foregoing amounts.

If the content of the rubber modified aromatic vinyl copolymer resin is less than about 5 parts by weight, the thermoplastic resin composition can suffer from deterioration in impact resistance and the like, and if the content of the rubber modified aromatic vinyl copolymer resin exceeds about 20 parts by weight, the thermoplastic resin composition can suffer from deterioration in flame retardancy, fluidity, weather resistance, and the like.

(C) Maleic Anhydride-Grafted Rubber Polymer

The maleic anhydride-grafted rubber polymer may be used together with barium sulfate to improve weather resistance, fluidity, impact resistance and heat resistance of the thermoplastic resin composition, and may be obtained by graft copolymerization of maleic anhydride (MAH) to a rubber polymer. The rubber polymer can be an olefin-based rubber polymer including one or more olefins, and optionally an aromatic vinyl monomer (such as a copolymer of olefin and/or an aromatic vinyl monomer).

Examples of the maleic anhydride-grafted rubber polymer may include without limitation maleic anhydride-grafted ethylene-octene rubber (EOR-g-MAH), maleic anhydride-grafted ethylene-butene rubber (EBR-g-MAH), maleic anhydride-grafted ethylene-propylene-diene monomer tripolymer (EPDM-g-MAH), maleic anhydride-grafted styrene-ethylene-butylene-styrene copolymer (SEBS-g-MAH), maleic anhydride-grafted polypropylene (PP-g-MAH), and/or maleic anhydride-grafted polyethylene (PE-g-MAH), and the like, and mixtures and/or combinations thereof.

The maleic anhydride may be present in an amount of about 0.1 wt % to about 5 wt % and the rubber polymer may be present in an amount of about 95 to about 99.9 wt %, each based on 100 wt % of the maleic anhydride-grafted rubber polymer, without being limited thereto.

In some embodiments, the maleic anhydride-grafted rubber polymer can include maleic anhydride in an amount of about 0.1, 0.2, 0.3, 0.4, 0.5, 0.6, 0.7, 0.8, 0.9, 1, 2, 3, 4, or 5 wt % based on 100 wt % of the maleic anhydride-grafted rubber polymer. Further, according to some embodiments, maleic anhydride can be present in an amount of from about any of the foregoing amounts to about any other of the foregoing amounts.

In some embodiments, the maleic anhydride-grafted rubber polymer can include rubber polymer in an amount of about 95, 96, 97, 98, 99, 99.1, 99.2, 99.3, 99.4, 99.5, 99.6, 99.7, 99.8, or 99.9 wt % based on 100 wt % of the maleic anhydride-grafted rubber polymer. Further, according to some embodiments, the rubber polymer can be present in an amount of from about any of the foregoing amounts to about any other of the foregoing amounts.

The thermoplastic resin composition can include the maleic anhydride-grafted rubber polymer (C) in an amount of about 0.5 to about 3 parts by weight, for example, about 0.5 to about 2 parts by weight, relative to about 100 parts by weight of the polycarbonate resin (A). In some embodiments, the thermoplastic resin composition can include the maleic anhydride-grafted rubber polymer (C) in an amount of about 0.5, 0.6, 0.7, 0.8, 0.9, 1, 2, or 3 parts by weight, based on about 100 parts by weight of the polycarbonate resin (A). Further, according to some embodiments, the maleic anhydride-grafted rubber polymer (C) can be present in an amount of from about any of the foregoing amounts to about any other of the foregoing amounts.

If the content of the maleic anhydride-grafted rubber polymer is less than about 0.5 parts by weight, the thermoplastic resin composition can suffer from deterioration in weather resistance, impact resistance, thermal stability, and the like, and if the content of the maleic anhydride-grafted rubber polymer exceeds about 3 parts by weight, the thermoplastic resin composition can suffer from deterioration in external appearance, flame retardancy, and the like.

(D) Glass Fibers

The glass fibers can improve specific gravity, mechanical properties including rigidity, impact resistance and the like of the thermoplastic resin composition, and may include glass fibers used for typical thermoplastic resin compositions.

The glass fibers may have a fibrous shape and may have various cross-sectional shapes, such as a circular shape, an elliptical shape, a rectangular shape, and the like. Mixtures of glass fibers with different cross-sectional shapes can also be used. For example, it can be desirable in terms of mechanical properties to use fibrous glass fibers having circular and/or rectangular cross-sectional shapes.

The glass fibers having a circular cross-sectional shape may have a diameter of about 5μm to about 20 μm and a pre-process length of about 2 mm to about 20 mm, and the glass fibers having a rectangular cross-sectional shape may have an aspect ratio (major length/minor length of the cross-section) of about 1.5 to about 10, a minor length of about 2 μm to about 10 μm, and a pre-process length of about 2 mm to about 20 mm. Within this range, the thermoplastic resin composition can have improved properties in terms of rigidity, processability, and the like.

The glass fibers may be subjected to surface treatment using a typical surface treatment agent.

The thermoplastic resin composition can include the glass fibers (D) in an amount of about 50 to about 100 parts by weight, for example, about 65 to about 85 parts by weight, relative to about 100 parts by weight of the polycarbonate resin (A). In some embodiments, the thermoplastic resin composition can include the glass fibers (D) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 parts by weight, relative to about 100 parts by weight of the polycarbonate resin (A). Further, according to some embodiments, the glass fibers (D) can be present in an amount of from about any of the foregoing amounts to about any other of the foregoing amounts.

If the content of the glass fibers is less than about 50 parts by weight, the thermoplastic resin composition can suffer from deterioration in rigidity, impact resistance, specific gravity, dimensional stability, and the like, and if the content of the glass fibers exceeds about 100 parts by weight, the thermoplastic resin composition can suffer from deterioration in external appearance, flame retardancy, weather resistance, and the like.

(E) Barium Sulfate

Barium sulfate ($BaSO_4$) may be used together with the maleic anhydride-grafted rubber polymer and the glass fibers to improve weather resistance, fluidity, impact resistance, heat resistance, and the like of the thermoplastic resin composition while increasing the specific gravity thereof. The barium sulfate may be barium sulfate used for typical thermoplastic resin compositions. For example, the barium sulfate may be white barium sulfate powder having an average particle diameter of about 1 µm to about 2 µm. Herein, the average particle diameter was measured using a particle size analyzer (Laser Diffraction Particle size analyzer LS I3 320, Beckman Coulter Co., Ltd.).

The thermoplastic resin compositions can include the barium sulfate (E) in an amount of about 10 to about 30 parts by weight, for example, about 15 to about 25 parts by weight, relative to about 100 parts by weight of the polycarbonate resin (A). In some embodiments, the thermoplastic resin composition can include the barium sulfate (E) in an amount of about 10, 11, 12, 13, 14, 15, 16, 17, 18, 19, 20, 21, 22, 23, 24, 25, 26, 27, 28, 29, or 30 parts by weight, relative to about 100 parts by weight of the polycarbonate resin (A). Further, according to some embodiments, the barium sulfate (E) can be present in an amount of from about any of the foregoing amounts to about any other of the foregoing amounts.

If the content of the barium sulfate is less than about 10 parts by weight, the thermoplastic resin composition can suffer from deterioration in mechanical properties, weather resistance, flame retardancy, and the like, and if the content of the barium sulfate exceeds about 30 parts by weight, the thermoplastic resin composition can suffer from deterioration in impact resistance, fluidity, and the like.

The maleic anhydride-grafted rubber polymer (C) and the barium sulfate (E) may be present in a weight ratio (C:E) of about 0.03:1 to about 0.1:1. In some embodiments, the maleic anhydride-grafted rubber polymer (C) and the barium sulfate (E) may be present in a weight ratio (C:E) of about 0.03:1, 0.04:1, 0.05:1, 0.06:1, 0.07:1, 0.08:1, 0.09:1, or 0.1:1. Within this range, the thermoplastic resin composition can have better weather resistance.

The glass fibers (D) and the barium sulfate (E) may be present in a weight ratio (D:E) of about 3:1 to about 5:1. In some embodiments, the glass fibers (D) and the barium sulfate (E) may be present in a weight ratio (D:E) of about 3:1, 4:1, or 5:1. Within this range, the thermoplastic resin composition can increase specific gravity with minimal or no deterioration in mechanical properties, weather resistance, and the like.

(F) Phosphorus Flame Retardant

The phosphorus flame retardant may be a phosphorus flame retardant used for typical flame retardant thermoplastic resin compositions. Examples of the phosphorus flame retardant may include without limitation phosphate compounds, phosphonate compounds, phosphinate compounds, phosphine oxide compounds, phosphazene compounds, metal salts thereof, and the like, and mixtures and/or combinations thereof.

The phosphorus flame retardant may include a phosphazene compound represented by Formula 1:

[Formula 1]

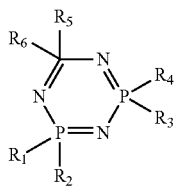

wherein $R_1$, $R_2$, $R_3$, $R_4$, $R_5$ and $R_6$ are each independently a hydrogen atom, a halogen atom, a substituted or unsubstituted $C_1$ to $C_{20}$ alkyl group, a substituted or unsubstituted $C_2$ to $C_8$ alkenyl group, a substituted or unsubstituted $C_3$ to $C_{20}$ cycloalkyl group, a substituted or unsubstituted $C_2$ to $C_{20}$ heterocycloalkyl group, a $C_1$ to $C_{20}$ alkoxy group, a $C_6$ to $C_{20}$ aryl or aryloxy group, a $C_5$ to $C_{20}$ heteroaryl group, a substituted or unsubstituted $C_3$ to $C_{20}$ alkoxycarbonylalkyl group, a substituted or unsubstituted $C_2$ to $C_{10}$ carbonylalkyl group, an amino group, or a hydroxyl group.

As used herein, the term "substituted" means that a hydrogen atom in a functional group is substituted with a substituent selected from the group consisting of a $C_1$ to $C_{10}$ alkyl group, a halogen atom, a nitro group, a cyano group, a hydroxyl group, an amino group, a $C_6$ to $C_{10}$ aryl group, a $C_3$ to $C_{10}$ cycloalkyl group, a $C_3$ to $C_{10}$ heterocycloalkyl group, a $C_4$ to $C_{10}$ heteroaryl group, and mixtures and/or combinations thereof.

In addition, unless otherwise defined, the terms "alkyl", "alkoxy", and other substituted compounds containing "alkyl" include linear or branched compounds; the term "alkenyl" includes $C_2$ to $C_8$ linear or branched compounds containing at least one double bond; and the term "cycloalkyl" includes $C_3$ to $C_{20}$ saturated monocyclic or saturated bicyclic compounds. The term "aryl" is an organic radical derived from an aromatic hydrocarbon by removing one hydrogen atom and includes a monocyclic or fused polycyclic ring system which contains 4 to 7, for example 5 to 6, cyclic atoms in each ring. Examples of the aryl may include phenyl, naphthyl, biphenyl, and/or tolyl, without being limited thereto.

The term "heterocycloalkyl" refers to a cycloalkyl group which contains 1 to 3 heteroatoms selected from N, O, and/or S as a saturated cyclic hydrocarbon backbone atom and contains carbon as remaining saturated monocyclic or bicyclic backbone atoms. Examples thereof may include without limitation pyrrolidinyl, azetidinyl, pyrazolidinyl, oxazolidinyl, piperidinyl, piperazinyl, morpholinyl, thiomorpholinyl, thiazolidinyl, hydantoinyl, valerolactamyl, oxiranyl, oxetanyl, dioxolanyl, dioxanyl, oxathiolanyl, oxathianyl, dithianyl, dihydrofuranyl, tetrahydrofuranyl, dihydropyranyl, tetrahydropyranyl, tetrahydropyridinyl, tetrahydropyrimidinyl, tetrahydrothiophenyl, tetrahydrothiopyranyl, diazepanyl, and/or azepanyl.

The term "heteroaryl" refers to an aryl group which contains 1 to 3 heteroatoms selected from N, O, and/or S as an aromatic ring backbone atom and contains carbon as remaining aromatic ring backbone atoms. The heteroaryl group includes a divalent aryl group in which heteroatoms in a ring are oxidized or quaternized to form, for example, N-oxides and/or quaternary salts. Examples of the heteroaryl may include furyl, thiophenyl, pyrrolyl, pyranyl, imidazolyl, pyrazolyl, thiazolyl, thiadiazolyl, isothiazolyl, isoxazolyl, oxazolyl, oxadiazolyl, triazinyl, tetrazenyl, triazolyl, tetrazolyl, furazanyl, pyridyl, pyrazinyl, pyrimidinyl, and/or pyridazinyl, without being limited thereto.

The thermoplastic resin composition can include the phosphorus flame retardant (F) in an amount of about 5 to about 20 parts by weight, for example, about 8 to about 15 parts by weight, relative to about 100 parts by weight of the polycarbonate resin (A). In some embodiments, the thermoplastic resin composition can include the phosphorus flame retardant (F) in an amount of about 5, 6, 7, 8, 9, 10, 11, 12, 13, 14, 15, 16, 17, 18, 19, or 20 parts by weight, relative to about 100 parts by weight of the polycarbonate resin (A). Further, according to some embodiments, the phosphorus flame retardant (F) can be present in an amount of from about any of the foregoing amounts to about any other of the foregoing amounts.

If the content of the phosphorus flame retardant is less than about 5 parts by weight, the thermoplastic resin composition can suffer from deterioration in flame retardancy, fluidity (formability), and the like, and if the content of the phosphorus flame retardant exceeds about 20 parts by weight, the thermoplastic resin composition can suffer from deterioration in impact resistance, heat resistance, and the like.

The thermoplastic resin composition may further optionally include one or more additives used in typical thermoplastic resin compositions. Examples of the additives may include anti-dripping agents such as a fluorinated olefin resins and the like, antioxidants, lubricants, release agents, stabilizers, pigments, dyes, and the like, and mixtures thereof, without being limited thereto. The additives may be present in an amount of about 0.001 to about 40 parts by weight, for example, about 0.1 to about 10 parts by weight, relative to about 100 parts by weight of the thermoplastic resin composition.

The thermoplastic resin composition may be prepared in pellet form by mixing the aforementioned components, followed by melt extrusion using a typical twin-screw extruder at about 200° C. to about 280° C., for example, about 220° C. to about 250° C.

The thermoplastic resin composition may have a notched Izod impact strength of about 10 kgf·cm/cm to about 20 kgf·cm/cm, for example, about 10 kgf·cm/cm to about 15 kgf·cm/cm, as measured on a ⅛" thick specimen in accordance with ASTM D256.

The thermoplastic resin composition may have a yellow index difference ($\Delta YI$) of about 1 to about 5, for example, about 1.5 to about 3.5, as measured on an injection molded specimen having a size of 50 mm×90 mm×3 mm in accordance with Equation 1:

$$\Delta YI = YI_1 - YI_0$$ [Equation 1]

where $YI_0$ is an initial yellow index of the specimen of the thermoplastic resin composition and $YI_1$ is a yellow index of the specimen measured after exposure under conditions of 85° C. and 85% RH for 500 hours.

The thermoplastic resin composition may have a flame retardancy of V-1 or higher, as measured on a 3 mm thick specimen in accordance with UL-94.

The thermoplastic resin composition may have a melt-flow index (MI) of about 30 g/10 min to about 45 g/10 min, for example, about 33 g/10 min to about 43 g/10 min, as measured under conditions of 250° C. and 10 kgf in accordance with ASTM D1238.

The thermoplastic resin composition may have a specific gravity of about 1.55 to about 1.65, for example, about 1.60 to about 1.65, as measured at 23° C. in accordance with ASTM D792 A.

The present disclosure also relates to a molded formed of the thermoplastic resin composition set forth above. The thermoplastic resin composition may be prepared in pellet form and the prepared pellets may be produced into various molded articles (products) by various molding methods, such as injection molding, extrusion molding, vacuum molding, and casting. Such molding methods are well known to those skilled in the art.

The molded article can have good properties in terms of impact resistance, weather resistance, flame retardancy, and/or fluidity and can be useful as interior/exterior materials for electric/electronic products and automobile parts, and an exterior material for buildings due to good properties in terms of chemical resistance, impact resistance, and balance therebetween. For example, the molded article may be used as a material for speakers.

Next, the present invention will be described in more detail with reference to the following examples. It should be understood that these examples are provided for illustration only and are not to be in any way construed as limiting the present invention.

EXAMPLES

Details of each component used in Examples and Comparative Examples are as follows:

(A) Polycarbonate Resin

A mixture of 23 wt % of (A1) a bisphenol A-based polycarbonate resin and 77 wt % of (A2) a bisphenol A-based polycarbonate resin is used.

(A1) A bisphenol A-based polycarbonate resin having a melt-flow index (MI) of 90±2 g/10 min (measured under conditions of 300° C. and 1.2 kgf in accordance with ISO 1133) is used.

(A2) A bisphenol A-based polycarbonate resin having a melt-flow index (MI) of 62±5 g/10 min (measured under conditions of 300° C. and 1.2 kgf in accordance with ISO 1133) is used.

(B) Rubber Modified Aromatic Vinyl Copolymer Resin

A mixture of 30 wt % of (B1) a rubber modified aromatic vinyl graft copolymer and 70 wt % of (B2) an aromatic vinyl copolymer resin is used.

(B1) Rubber Modified Aromatic Vinyl Graft Copolymer

A core-shell type graft copolymer (g-MABS) obtained by graft copolymerization of 40 wt % of a monomer mixture of styrene, acrylonitrile and methyl methacrylate (styrene/acrylonitrile/methyl methacrylate: 20 wt %/10 wt %/70 wt %) to 60 wt % of butadiene rubber particles having an average particle diameter of 0.28 μm is used.

(B2) Aromatic Vinyl Copolymer Resin

A resin (weight average molecular weight: 160,000 g/mol) obtained by polymerization of 70 wt % of methyl methacrylate, 20 wt % of styrene and 10 wt % of acrylonitrile is used.

(C) Maleic Anhydride-Grafted Rubber Polymer

A maleic anhydride-grafted ethylene-octene rubber (Manufacturer: Woosung Chemical Co., Ltd., Product Name: SP2000S) is used.

(D) Glass Fibers

Glass fiber (Manufacturer: KCC, Product Name: CS321-$EC_{10}$-3) is used.

(E) Barium Sulfate

Barium sulfate (Manufacturer: DooriChem Inc., Product Name: ZJ-051) is used.

(F) Phosphorus Flame Retardant

A phosphazene compound (Manufacturer: Weihai Jinwei ChemIndustry Co., Ltd., Product Name: HPCTP) is used.

(G) Inorganic Filler

Talc (Manufacturer: KOCH, Product Name: KCP-04) is used.

Examples 1 to 3 and Comparative Examples 1 to 5

The aforementioned components are mixed in amounts as listed in Tables 1 and 2, followed by extrusion at 230° C., thereby preparing a thermoplastic resin composition in pellet form. Here, extrusion is performed using a twin-screw extruder (L/D: 36, Ψ: 45 mm). The prepared pellets are dried at 80° C. for 2 hours or more and then subjected to injection molding using a 6 oz. injection machine (molding temperature: 300° C.), thereby preparing a specimen. The prepared specimen is evaluated as to the following properties. Results are shown in Table 1.

Property Evaluation (1) Notched Izod impact strength (unit: kgf·cm/cm): Notched Izod impact strength is measured on a ⅛" thick Izod specimen in accordance with ASTM D256.

(2) Yellow index difference (ΔYI): Yellow index difference of an injection molded specimen having a size of 50 mm×90 mm×3 mm is calculated by Equation 1 to evaluate weather resistance:

$$\Delta YI = YI_1 - YI_0 \qquad \text{[Equation 1]}$$

wherein $YI_0$ is an initial yellow index of the specimen of the thermoplastic resin composition and $YI_1$ is a yellow index of the specimen measured after exposure under conditions of 85° C. and 85% RH for 500 hours.

(3) Flame retardancy: Flame retardancy is measured on a 3 mm thick specimen in accordance with the UL-94 inflammability testing standard.

(4) Melt-flow index (MI, unit: g/10 min): Melt-flow index is measured under conditions of 250° C. and 10 kgf in accordance with ASTM D1238.

(5) Specific gravity: Specific gravity is measured at 23° C. in accordance with ASTM D792 A.

(6) Tan δ (loss tangent): Loss tangent is measured on a 3 mm thick specimen under conditions of 50° C. to 200° C. based on dynamic mechanical analysis (DMA) using a TA Instrument Q800. Here, a higher loss coefficient provides a higher tan δ and a tan δ value of 1.6 or more indicates good sound quality of a speaker.

Example 3 containing a small amount of glass fibers and an excess of barium sulfate suffers from deterioration in impact strength, weather resistance, flame retardancy, and the like; the thermoplastic resin composition of Comparative Example 4 containing an excess of glass fibers and a small amount of barium sulfate suffers from deterioration in fluidity; and the thermoplastic resin composition of Comparative Example 5 containing talc instead of barium sulfate suffers from deterioration in specific gravity, tan δ, and the like.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as

TABLE 1

|  | Example | | | Comparative Example | | | | |
| --- | --- | --- | --- | --- | --- | --- | --- | --- |
|  | 1 | 2 | 3 | 1 | 2 | 3 | 4 | 5 |
| (A) (parts by weight) | 100 | 100 | 100 | 100 | 100 | 100 | 100 | 100 |
| (B) (parts by weight) | 9.6 | 9.6 | 9.6 | 9.6 | 9.6 | 9.6 | 9.6 | 9.6 |
| (C) (parts by weight) | 0.6 | 1.0 | 1.9 | 0.2 | 3.8 | 1.0 | 1.0 | 1.0 |
| (D) (parts by weight) | 73 | 73 | 73 | 73 | 73 | 45 | 105 | 73 |
| (E) (parts by weight) | 19.2 | 19.2 | 19.2 | 19.2 | 19.2 | 40 | 5 | — |
| (F) (parts by weight) | 9.6 | 9.6 | 9.6 | 9.6 | 9.6 | 9.6 | 9.6 | 9.6 |
| (G) (parts by weight) | — | — | — | — | — | — | — | 19.2 |
| Notched Izod Impact strength | 10.5 | 13.1 | 13.9 | 9.2 | 8.5 | 8.5 | 15.5 | 14.2 |
| Yellow index difference (Δ YI) | 3.0 | 2.7 | 2.6 | 5.5 | 6.3 | 8.4 | 3.1 | 2.7 |
| Flame retardancy | V-1 | V-1 | V-1 | V-1 | V-1 | V-2 | V-1 | V-1 |
| Melt-flow index | 41.5 | 36.1 | 35.2 | 45.7 | 35.9 | 62 | 11.9 | 30.5 |
| Specific gravity | 1.62 | 1.62 | 1.61 | 1.62 | 1.61 | 1.75 | 1.60 | 1.49 |
| Tanδ | 1.7 | 1.7 | 1.7 | 1.7 | 1.7 | 1.9 | 1.7 | 1.4 |

From the results, it can be seen that the thermoplastic resin compositions according to the present disclosure can have high specific gravity characteristics (good sound quality of speaker) and good properties in terms of impact resistance, weather resistance, flame retardancy, fluidity, and the like.

Conversely, it can be seen that the thermoplastic resin composition of Comparative Example 1 containing a small amount of the maleic anhydride-grafted rubber polymer suffers from deterioration in impact resistance, weather resistance, and the like; and the thermoplastic resin composition of Comparative Example 2 containing an excess of the maleic anhydride-grafted rubber polymer suffers from deterioration in impact resistance, weather resistance, and the like. The thermoplastic resin composition of Comparative limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition comprising:
   100 parts by weight of a polycarbonate resin;
   5 to 20 parts by weight of a rubber modified aromatic vinyl copolymer resin;
   0.5 to 3 parts by weight of a maleic anhydride-grafted rubber polymer;
   50 to 100 parts by weight of glass fibers;
   10 to 30 parts by weight of barium sulfate; and
   5 to 20 parts by weight of a phosphorus flame retardant, wherein the glass fibers and the barium sulfate are present in a weight ratio of 3:1 to 5:1, and wherein the thermoplastic resin composition has:

a notched Izod impact strength of 10 kgf·cm/cm to 20 kgf·cm/cm, as measured on a ⅛" thick specimen in accordance with ASTM D256;

a yellow index difference (ΔYI) of 1 to 5, as measured on an injection molded specimen having a size of 50 mm×90 mm×3 mm in accordance with Equation 1:

$$\Delta YI = YI_1 - YI_0 \quad \text{[Equation 1]}$$

where $YI_0$ is an initial yellow index of the specimen of the thermoplastic resin composition and $YI_1$ is a yellow index of the specimen measured after exposure under conditions of 85° C. and 85% RH for 500 hours;

a flame retardancy of V-1 or higher, as measured on a 3 mm thick specimen in accordance with UL-94;

a melt-flow index (MI) of 30 g/10 min to 45 g/10 min, as measured under conditions of 250° C. and 10 kgf in accordance with ASTM D1238, and a specific gravity of 1.55 to 1.65, as measured at 23° C. in accordance with ASTM D792 A.

2. The thermoplastic resin composition according to claim 1, wherein the rubber modified aromatic vinyl copolymer resin comprises a rubber modified aromatic vinyl graft copolymer and an aromatic vinyl copolymer resin.

3. The thermoplastic resin composition according to claim 2, wherein the rubber modified aromatic vinyl graft copolymer is obtained by graft copolymerization of a monomer mixture comprising an aromatic vinyl monomer and a vinyl cyanide monomer to a rubber polymer.

4. The thermoplastic resin composition according to claim 1, wherein the maleic anhydride-grafted rubber polymer comprises maleic anhydride-grafted ethylene-octene rubber (EOR-g-MAH), maleic anhydride-grafted ethylene-butene rubber (EBR-g-MAH), maleic anhydride-grafted ethylene-propylene-diene monomer tripolymer (EPDM-g-MAH), and/or maleic anhydride-grafted styrene-ethylene-butylene-styrene copolymer (SEBS-g-MAH).

5. The thermoplastic resin composition according to claim 1, wherein the phosphorus flame retardant comprises a phosphate compound, a phosphonate compound, a phosphinate compound, a phosphine oxide compound, and/or a phosphazene compound.

6. The thermoplastic resin composition according to claim 1, wherein the maleic anhydride-grafted rubber polymer and the barium sulfate are present in a weight ratio of 0.03:1 to 0.1:1.

7. A molded article formed of the thermoplastic resin composition according to claim 1.

8. A molded article according to claim 7, wherein the molded article is a speaker.

9. The thermoplastic resin composition according to claim 1, wherein the thermoplastic resin composition has a specific gravity of 1.60 to 1.65, as measured at 23° C. in accordance with ASTM D792 A.

10. The thermoplastic resin composition according to claim 1, wherein the thermoplastic resin composition has a tan δ(loss tangent) of 1.6 or more, as measured on a 3 mm thick specimen under conditions of 50° C. to 200° C. based on dynamic mechanical analysis (DMA) using a TA Instrument Q800.

11. The thermoplastic resin composition according to claim 1, wherein the thermoplastic resin composition has a specific gravity of 1.60 to 1.65, as measured at 23° C. in accordance with ASTM D792 A, and a tan δ(loss tangent) of 1.6 or more, as measured on a 3 mm thick specimen under conditions of 50° C. to 200° C. based on dynamic mechanical analysis (DMA) using a TA Instrument Q800.

* * * * *